United States Patent Office 2,725,950
Patented Dec. 6, 1955

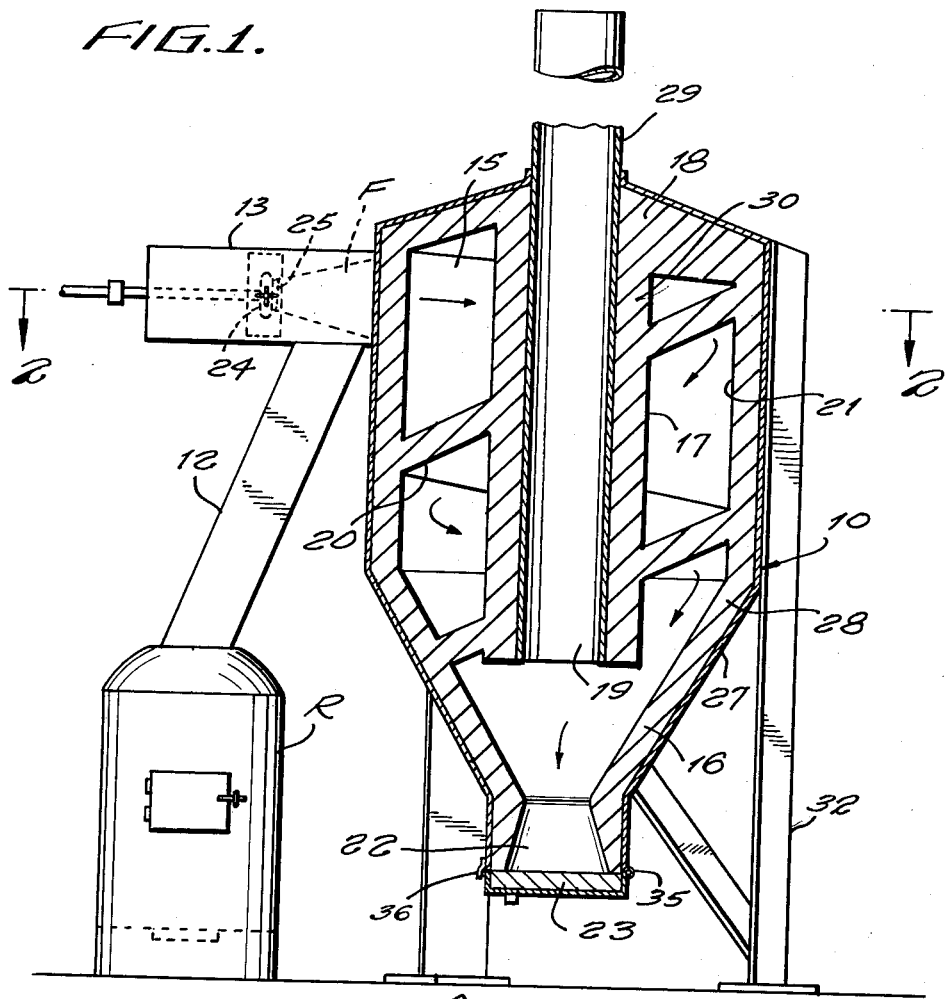
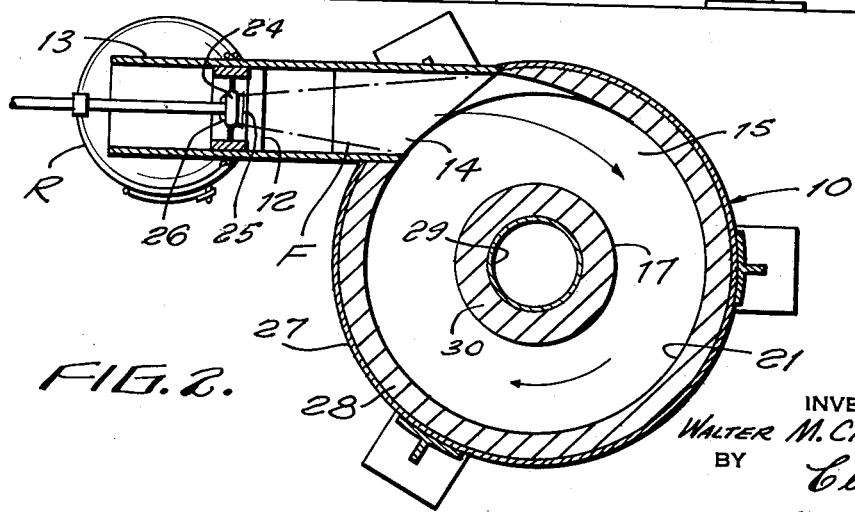

2,725,950
CENTRIFUGE FURNACE

Walter M. Christiansen, Midland Park, N. J., assignor to Technical Specialties, Inc., Ramsey, N. J., a corporation of New Jersey Application June 17, 1953, Serial No. 362,229

6 Claims. (Cl. 183—6)

This invention relates to a furnace for consuming the products of combustion given off by the incomplete burning of refuse, trash, sawdust and other waste materials, and for collecting the uncombustible material freed by the burning of the waste materials.

In the combustion of waste materials in incinerators and the like considerable water vapor is given off together with unconsumed gases, carbon and other comminuted particles and fumes with the consequent liberation of obnoxious odors. This may be due to improper air supply or inadequate combustion temperature to effect a complete combustion of all of the burnable material in the refuse.

In order to effect the complete combustion of all the products of combustion in waste material, the present invention comprehends a furnace connected with the combustion chamber of an incinerator and the like by which the gases and products given off by the incinerator are raised to a high temperature and supplied with air sufficient to support complete combustion of all the unconsumed products.

Still another object of the invention is to provide a furnace in the form of a centrifuge having a downwardly directed spiral combustion chamber for the unconsumed products of combustion which enter the furnace in tangential relation and are forced downwardly therethrough by a flame jet which ignites the burnable material and functions to draw air into the furnace to support combustion therein.

Still another object of the invention is to provide a centrifuge furnace of said character in which the spiral combustion chamber is arranged about a flue stack communicating with the spiral chamber at its lower end and discharging to the atmosphere above the furnace.

Still another object of the invention is to provide a centrifuge furnace having a lower extremity which is located below the influence of the draft through the stack for the deposit of unconsumable particles and the like.

With the foregoing and other objects in view, reference is now made to the following specification and accompanying drawings in which the preferred embodiment of the invention is illustrated.

In the drawings:

Fig. 1 is a vertical sectional view through a centrifuge furnace constructed in accordance with the invention and showing the same in association with a refuse burner illustrated in elevation.

Fig. 2 is a cross-sectional view taken approximately on line 2—2 of Fig. 1.

The centrifuge furnace indicated generally by the reference character 10 is adapted to be used in conjunction with any type of incinerator or refuse burner such as indicated by the reference character R which is connected with the furnace 10 by a duct 12 leading from the top of the refuse burner and connected with the under side of a burner duct 13. The burner duct 13 opens into the centrifuge furnace 10 adjacent the top and at one side thereof through the opening 14 and functions to direct the unconsumed products of combustion from the refuse burner R tangentially into the combustion chamber of the centrifuge furnace.

The furnace 10 is of general cylindrical formation and is provided with a spiral combustion chamber 15 extending continuously from the opening 14 to the inverted tapered lower portion 16 and about a central flue stack 17. The flue stack is secured to the top wall 18 of the furnace and extends downwardly to the tapered portion 16 with the lower end 19 thereof in open communication with the combustion chamber 15. The spiral combustion chamber 15 is formed by a spiral baffle 20 extending about the flue stack 17 and between the same and the peripheral wall 21 of the furnace. The tapered portion 16 forms a hopper below the combustion chamber and the flue stack and terminates in an ash pit 22 below the restricted lower end of the hopper for collecting the unconsumed particles of ash, carbon and the like. The ash pit 22 is widened below the restricted lower end of the hopper so as to be out of the influence of the draft at the lower end of the flue stack 17. The ash pit 22 is open at the bottom and is normally closed by a door 23 which is adapted to be opened for the removal of the unconsumed material collected therein.

In order to raise the temperature in the combustion chamber 15 to effect complete combustion of all the burnable material and gases emitted by the waste burner, a burner 24 is arranged in the burner duct 13 with the nozzle 25 thereof disposed adjacent to the top of the duct 12. The burner 24 is of the type for projecting a flame jet indicated by the broken line F which passes over the top of the duct 12 and through the opening 14 and into the top of the combustion chamber 15. The flame thus produces a suction in the duct 12 for effecting a rapid upward flow of the unconsumed gases and products emitted by the refuse burner. The burner 24 is adjustable longitudinally of the burner duct 13 and is provided with an adjustable intake 26 for supplying the air required for the burner and for admitting air into the combustion chamber which is required for the complete combustion of the gases and products discharged from the refuse burner.

The centrifuge furnace is preferably composed of a metallic shell 27 with a lining 28 of firebrick or the like, and the baffle 20 is also of firebrick or the like. The flue stack 17 is preferably constructed of a metal shell 29 which projects above the furnace with the top thereof open to the atmosphere and within the furnace the shell 29 is provided with a lining 30 of firebrick or the like.

The furnace is supported in any desired manner such as by the structural steel frame 32 which supports the furnace in an elevated relation to permit of convenient access to the door 23 for removal of ash and other unburnable material deposited in the bottom of the furnace. The door 23 is hinged at 35 and is provided with a latch 36 for securing the same in closed relation.

While the preferred embodiment of the invention has been described in the specification and illustrated in the drawings, it is to be understood that the invention is not so limited but shall cover and include any and all modifications and forms thereof which fall within the scope of the invention.

What is claimed is:

1. In a furnace for the combustion of gases and burnable products given off by the incomplete burning of material in a refuse burner and the like, said furnace having an upright peripheral wall and top and bottom walls, a flue stack extending through the top wall with its open lower end spaced from the bottom wall, a spiral baffle extending spirally about the flue stack and between the same and the peripheral wall to provide a spiral combustion chamber in communication with the lower end of the flue stack, a burner duct connected with the peripheral wall of the furnace and opening into the combustion chamber at the top thereof, a duct connected with the refuse burner and with said burner duct, and a jet burner located in said burner duct for projecting a flame into the combustion chamber for burning the burnable materials given off by the refuse burner.

2. In a furnace for the combustion of gases and burnable products given off by the burning of material in a refuse burner and the like, said furnace including a top wall and a peripheral side wall having a downwardly tapered lower portion, a flue stack extending through the top wall and downwardly centrally within the furnace, a spiral baffle extending spirally about the flue stack between the same and the peripheral side wall to provide a spiral combustion chamber in communication with the lower end of the flue stack, a burner duct connected with the peripheral wall of the furnace and opening into the combustion chamber at the top thereof, a duct connected with the refuse burner and with said burner duct, a burner located in said burner duct for projecting a flame across the top of said last mentioned duct and into the combustion chamber for burning the burnable material given off by the refuse burner, and said tapered lower portion being located below the combustion chamber for the deposit therein of ash and unburnable material.

3. In a furnace for the combustion of gases and burnable products given off by the incomplete burning of material in a refuse burner and the like, said furnace having a top wall and a cylindrical side wall, a flue stack extending through the top wall and downward centrally within the cylindrical side wall with the open lower end of the flue stack located adjacent the top of said tapered lower portion, a spiral baffle extending spirally about the flue stack between the same and the cylindrical wall to provide a spiral combustion chamber in communication with the lower end of the flue stack, a burner duct connected with the cylindrical wall of the furnace and opening into the combustion chamber at one side of the center and at the top thereof, a duct connected with the refuse burner and with said burner duct, a burner located in said burner duct for projecting a flame into the combustion chamber for burning the burnable material given off by the refuse burner, said burner being adjustable longitudinally of said burner duct, and means for admitting air into the combustion chamber.

4. In a furnace for the combustion of gases and burnable products given off by a refuse burner, said furnace having a top wall and a cylindrical side wall provided with a downwardly tapered lower portion, a flue stack extending through the top wall and downwardly within the cylindrical side wall with the open lower end of the flue stack located adjacent the top of said tapered lower portion, a spiral baffle extending spirally about the flue stack to provide a spiral combustion chamber in communication with the lower end of the flue stack, a burner duct connected with the cylindrical wall of the furnace and opening into the combustion chamber at one side of the center and at the top thereof, a duct connected with the refuse burner and with said burner duct, a burner located in said burner duct for projecting a flame across the top of said last mentioned duct and into the combustion chamber for burning the burnable material given off by the refuse burner, said burner being adjustable longitudinally of said burner duct, and said tapered lower portion being located below the combustion chamber for collecting ash and unburnable material.

5. In a furnace, furnace walls providing a chamber, a flue stack extending above the furnace and downwardly into the chamber with the open lower end thereof located above the bottom wall of the furnace, a baffle surrounding the flue stack within the chamber providing a spiral combustion duct in communication with the lower end of the flue stack, a burner duct connected with the furnace and opening into the combustion duct at one side of the center of the furnace and at the top thereof, a burner located in said burner duct for projecting a flame into said combustion duct, and an inlet duct connected with said burner duct between said burner and said combustion duct for admitting products to be burned by said flame and over which inlet duct the flame of the burner is projected.

6. In a furnace, a furnace wall providing a chamber, a flue stack extending above the furnace and downwardly into the chamber with the open lower end thereof located above the bottom wall of the furnace, a baffle surrounding the flue stack within the chamber providing a spiral combustion duct in communication with the lower end of the flue stack, a burner duct connected with the furnace and opening into the combustion duct adjacent the top of the furnace, a burner located in said burner duct for projecting a flame into said combustion duct, an inlet duct for admitting products to be burned to said combustion duct and over which inlet duct the flame of the burner is projected for producing a suction in the inlet duct for effecting a rapid flow of the products to be burned, and said furnace walls being downwardly tapered at the lower end of said flue stack so as to decrease the cross-sectional area of the combustion duct adjacent the open lower end of the flue stack.

References Cited in the file of this patent

UNITED STATES PATENTS

| | | |
|---|---|---|
| 1,180,792 | Norrman | Apr. 15, 1916 |
| 2,084,167 | Stilson | June 15, 1937 |
| 2,527,934 | Jefferies, Sr. | Oct. 31, 1950 |

FOREIGN PATENTS

| | | |
|---|---|---|
| 518,807 | France | Jan. 10, 1921 |
| 554,709 | Great Britain | July 15, 1943 |
| 685,082 | Great Britain | Dec. 31, 1952 |